A. H. RAY.

Gas Burner.

No. 2,605.

Reissued May 14, 1867.

Correct delineation of the Tip H and Tube G

Witnesses

Isaac A. Bonnell

Samuel Barnett

Inventor

Elliott P. Gleason

N. PETERS, Photo-Lithographer, Washington, D. C.

United States Patent Office.

ELLIOTT P. GLEASON, OF NEW YORK, N. Y., ASSIGNEE OF AMOS H. RAY.

*Letters Patent No.* 20,584, *dated June* 15, 1858; *reissue No.* 2,605, *dated May* 14, 1867.

IMPROVEMENT IN GAS-BURNERS.

The Schedule referred to in these Letters Patent and making part of the same.

TO ALL WHOM IT MAY CONCERN:

Be it known that AMOS H. RAY, of the city of Boston, in the county of Suffolk, and State of Massachusetts, has invented certain new and useful Improvements in Gas-Burners; and I do hereby declare the following to be a full, clear, and exact description of the same, reference being had to the accompanying drawings, making part of this specification, in which—

Similar letters of reference indicate corresponding parts in all the figures.

Figure 1:
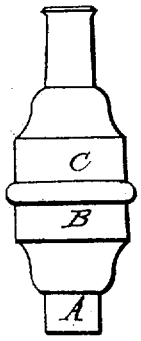
Figure 1 is a view of the exterior of the said gas-burner.
Figure 2:
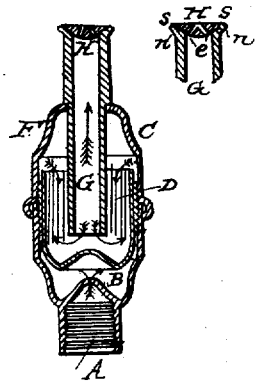
Figure 2 is a vertical section of the same, showing the interior arrangement.
Figure 3:
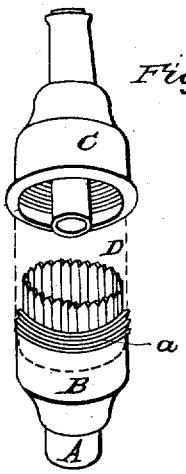
Figure 3 is a perspective view of the same, showing the top of the shell unscrewed from the lower portion of the same.
Figure 4:
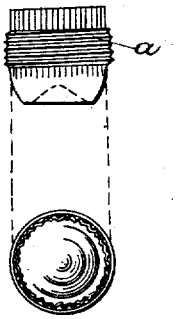
Figure 4 is a plan and elevation of a corrugated cone, which is employed within the burner.

The said invention of AMOS H. RAY consists in a novel construction and arrangement within the gas-burner, by means of which the gas, on being admitted thereto, is detained, distributed, and, by the heat of its own flame, highly rarefied, so that a more perfect combustion is afforded at the tip or outlet, which may be described as follows:

The shell of the burner is composed of two pieces, C and B, which are united in a tight joint by the screw-thread *a* in the centre. The lower portion, B, is provided with a tube, A, which screws on the nipple of the supply pipe, whence the gas is admitted to the burner; and the upper portion, C, is surmounted by a tube, G, with a tip, H, at the top, where the gas escapes and is inflamed. The tube G is of thick metal, as shown in fig. 2, and becomes highly heated from the flame at the top, and communicates the heat to the thinner metal shell C B, which is purposely made large, both for the sake of capacity, and the extent of heating surface which it affords. The tube G also extends down at some length in the centre of the shell, and furnishes another considerable heating surface within, dependent from the top of the shell. In order to obtain the best effect from these two heating surfaces the current of gas is first deflected and distributed in a thin stratum over the interior surface of the heated shell, and again deflected and distributed over the exterior and interior surfaces of the heated tube G, by means of the perforated nipple *c*, at the bottom of the burner, and the corrugated metal cone D, figs. 2 and 4. This cone D is of thinner metal than the shell, within the lower portion, B, of which it fits snugly, its corrugations affording numerous longitudinal pipes or passages for the gas next to the straight portion of the heated shell, by means of which the volume of gas is distributed in thin currents evenly over the heated surface of the shell. With this construction and arrangement the operation is, that the current of gas is admitted in a single jet through the perforation *c* at the bottom, against the bottom of the cone D; thence it is deflected towards the shell, and is distributed through the corrugations to the top of the cone D, whence it is deflected against the exterior surface of the tube G, and again against the interior surface of the same, whence it passes in a direct current to the tip H, and is inflamed, the obstructions afforded by the several deflections and the distribution (as indicated by the arrows in fig. 2) having a tendency to detain the gas against the heating surfaces within the burner; and thus, whilst the current of gas is checked and regulated, it is also heated and rarefied, as within a reservoir, and prepared for its final and perfect combustion at the tip or outlet.

The invention of AMOS H. RAY further consists in a novel construction and mode of securing the tip in the end of the burner-tube, and is calculated to overcome a difficulty that I will mention. Heretofore the tip has been constructed with a groove underneath, so that it fitted like a lid or cover over the end of the burner-tube; and both the tip and the tube were formed wholly or in part of tin, or coated with tin, by the fusing of which metal the tip was secured upon the end of the tube. This mode of fusing the tip to the tube confines its manufacture almost exclusively to the metal mentioned, which, from its very fusibility, is obviously unsuited to withstand the degree of heat to which this portion of a gas-burner is subjected. Now, by the improved mode mentioned of securing the tip in the end of the burner-tube, fusibility in either the tip or the tube is unnecessary, and the tip may therefore be formed of German silver, brass, or any suitable metal.

Figure 5:
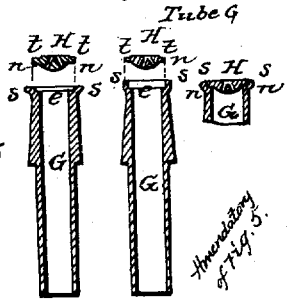
Figure 5 is a vertical section of the burner-tube, and the tip at the top of the same.
Figure 6:
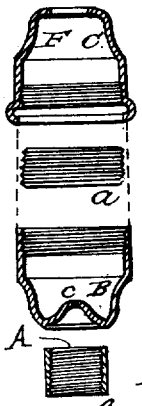
Figure 6 is a vertical section of the several parts composing the shell of the gas-burner separated.

The improved tip of the materials mentioned is constructed, as shown in fig. 5, with the usual convex or conical projection in the centre, on the under side, and a slight concavity opposite, on the upper side, to provide for the oblique perforations through which the gas is emitted and inflamed; and, in addition thereto, with a groove, *t*, on the upper edge, forming a thin lip, *n*, at its periphery, with a flat surface underneath, to provide for securing the tip in the end of the tube, in the manner hereinafter described. A tip of this construction may be made by punching from a suitable thickness of sheet metal a disk of the requisite diameter, and afterward, by means of a suitably-wrought die and former, in a drop or other press, striking or forcing the said disk into the form described. The excess of material, which will merge itself into the thin lip *n*, may be removed by punching the tip through a "cutting-die" of the requisite diameter. The tip may also be made of lumps or grains of metal, brass, German silver, &c., cut from a length of wire, by first striking the grains or lumps into a die that will form the projection on the under side, and flatten the upper side and the remaining portion of the material in the form of a disk of the requisite thickness. In this form the tip is placed in a die in a cutting-press, and, by means of a suitably-formed plunger, the depression in the centre, and the lip *n* at the periphery, on the upper side, formed, and the excess of material at the periphery trimmed off at one stroke or operation. The tip may also be turned or milled into the form described from a cylindrical piece of metal while it is revolving in a lathe. The perforations are drilled separately from the centre of the upper surface in the usual way by means of a suitably-sized drill, while the tip is held in a suitable device at the proper angle therewith. The tip H, constructed as described, is let into the end of the burner-tube G, resting on the annular seat *e*, cut therein, and the surrounding thin edge S of the tube is turned over the periphery of the tip, and laid flat in the groove *t*, on the upper edge thereof, by means of a hand-burnisher, or an equivalent instrument, whilst the tube is revolving, as in a lathe, which effectually secures the tip therein in a gas-tight joint.

*Claims.*

What is claimed as the invention of AMOS H. RAY, is—

1. The construction and arrangement within the burner shell of the corrugated cone D, the heating tube G, and a suitable perforation or inlet, *c*, with the mode of operation, substantially as and for the purpose described.

2. In the construction of a gas-burner, the use of a tip, constructed and secured substantially as described.

ELLIOTT P. GLEASON.

Witnesses:

ISAAC A. BRUMELL,

SAMUEL BARRATT.